Dec. 2, 1924.

B. E. CRAIN

AUTOMOBILE BED

Filed Aug. 13, 1923

Burton E. Crain
INVENTOR

BY Victor J. Evans
ATTORNEY

WITNESS:

Dec. 2, 1924.
B. E. CRAIN
AUTOMOBILE BED
Filed Aug. 13, 1923  4 Sheets-Sheet 2
1,517,619
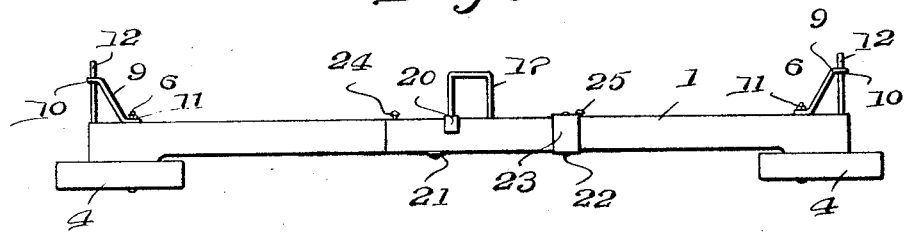
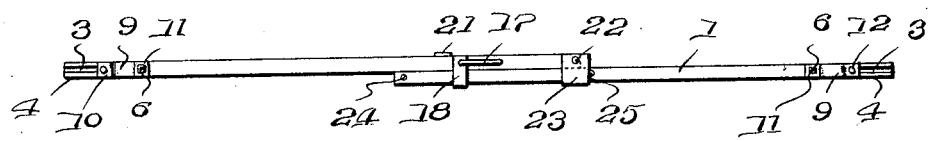
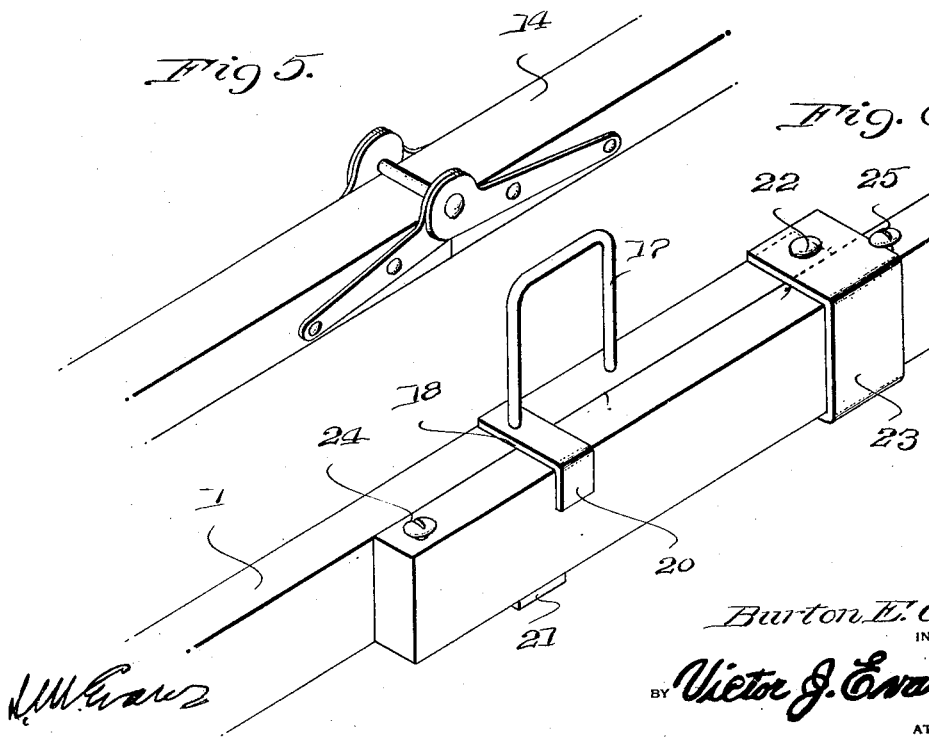
Burton E. Crain
INVENTOR
BY Victor J. Evans
ATTORNEY
WITNESS:

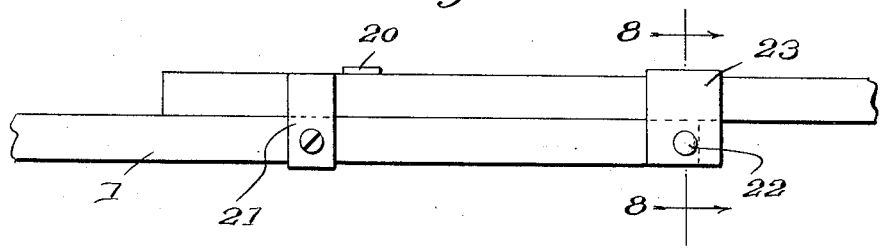
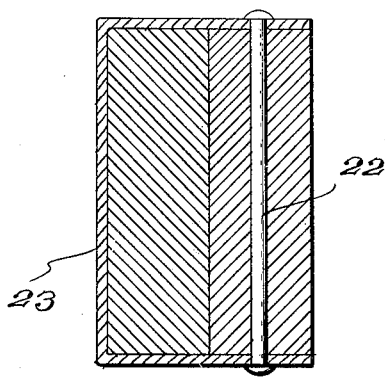
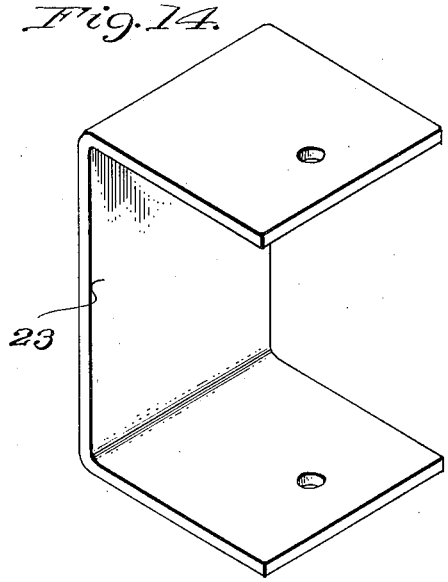
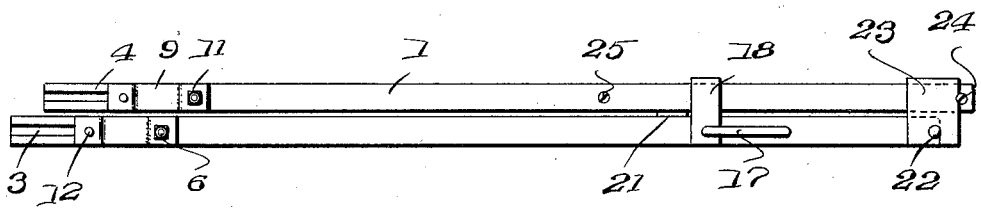

Dec. 2, 1924.
B. E. CRAIN
AUTOMOBILE BED
Filed Aug. 13, 1923
1,517,619
4 Sheets-Sheet 4
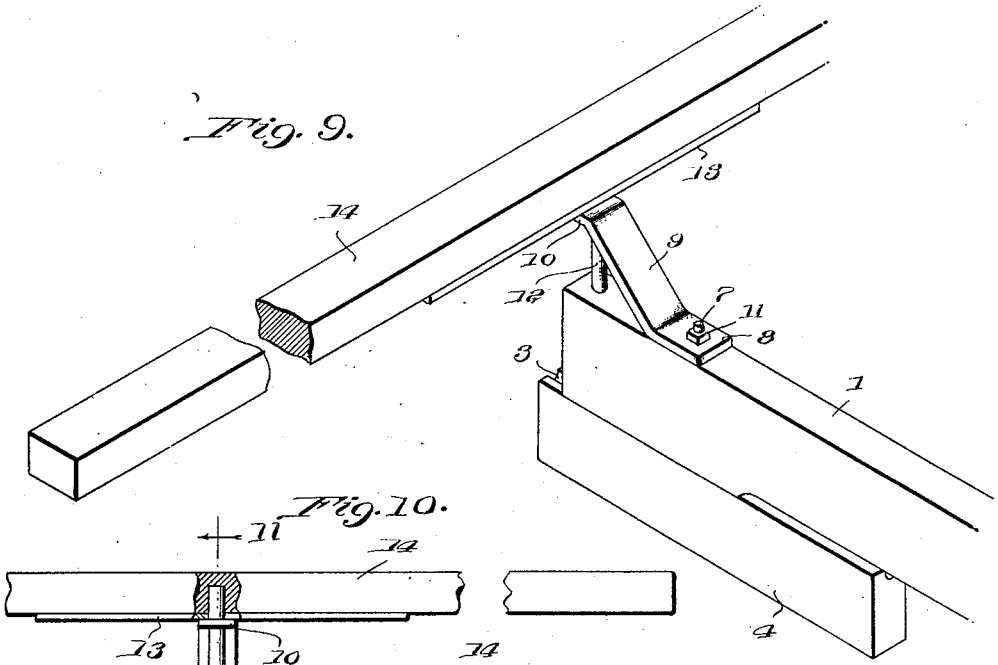
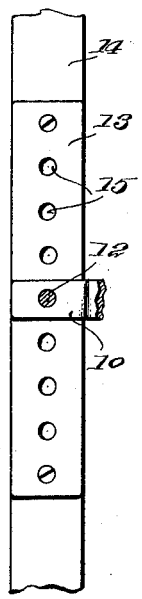
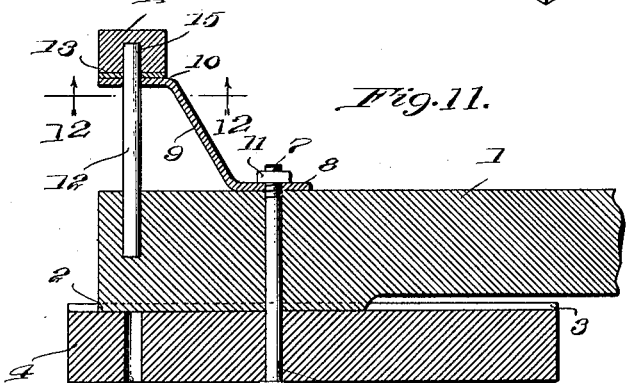
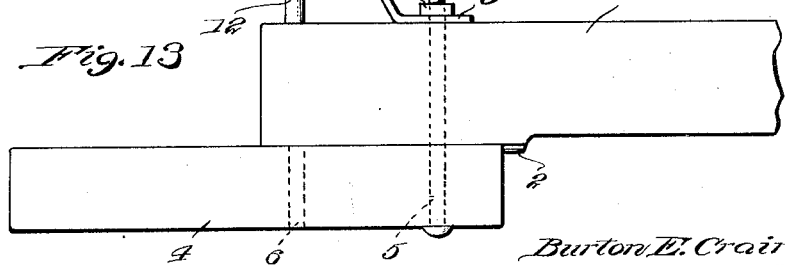
Burton E. Crain
INVENTOR
BY Victor J. Evans
ATTORNEY
WITNESS:

Patented Dec. 2, 1924.

1,517,619

UNITED STATES PATENT OFFICE.

BURTON E. CRAIN, OF SPRINGFIELD, MISSOURI.

AUTOMOBILE BED.

Application filed August 13, 1923. Serial No. 657,111.

*To all whom it may concern:*

Be it known that I, BURTON E. CRAIN, a citizen of the United States, residing at Springfield, in the county of Greene and State of Missouri, have invented new and useful Improvements in Automobile Beds, of which the following is a specification.

This invention has reference to foldable beds or cots especially designed for use within the body of an automobile, and may be considered in the nature of an improvement on my U. S. patent application, Serial No. 523,114, allowed April 9, 1923, Patent No. 1,478,358.

The invention further consists in the construction, combination and operative association of parts such as is set forth in the following description and pointed out with particularity in the appended claims.

The drawings which accompany and which form part of this application illustrate a satisfactory embodiment of my improvement reduced to practice, and wherein:—

Figure 3 is an enlarged elevation of one of the extensible cross bars.

Figure 4 is a plan view thereof.

Figure 5 is a fragmentary perspective view to more clearly illustrate the hinged joint between the side bar sections.

Figure 6 is a similar view to more clearly disclose the manner in which the cross bar sections are locked when the end portions thereof are arranged side by side.

Figure 7 is a bottom plan view of the construction illustrated in Figure 6.

Figure 8 is a sectional view on the line 8—8 of Figure 7.

Figure 9 is a fragmentary perspective view looking toward the end of one of the cross bars and showing the manner in which one of the longitudinal bars is positioned thereon.

Figure 10 is a view looking toward the side of the longitudinal bar and the end of the cross bar, parts being broken away and in section.

Figure 11 is a sectional view on the line 11—11 of Figure 10.

Figure 12 is a view approxmately on the line 12—12 of Figure 11, looking in the direction of the arrows.

Figure 13 is a side elevation to illustrate the manner in which the foot of the cross bar is extended.

Figure 14 is a perspective view of the hinge for connecting the cross bar sections.

Fig. 15 is a plan view of the cross bars.

Figure 1:
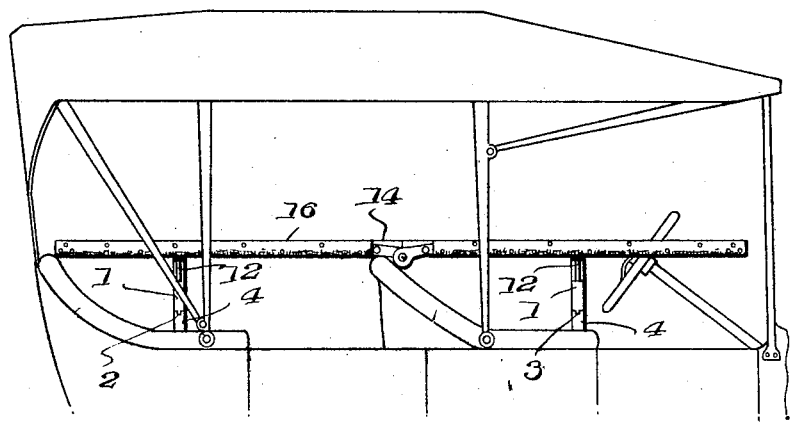
Figure 1 is a side elevation of an automobile body having my improved bed supported therein.
Figure 2:
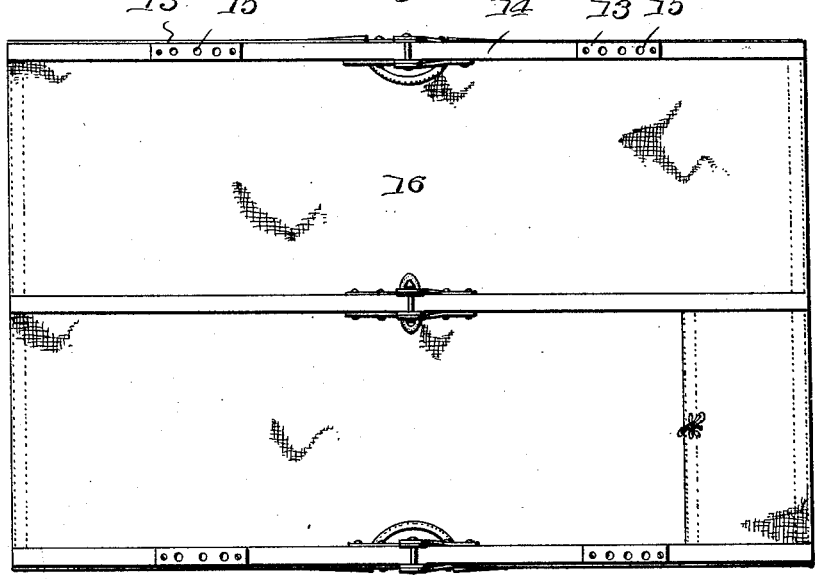
Figure 2 is an inverted plan view of the bed.

Except for construction herein referred to with particularity my invention is similar to that set forth in my mentioned U. S. patent application, Serial No. 523,114, Patent No. 1,478,358.

Referring now to the drawings in detail 1 designates the cross bars. Each bar at its lower corners is slightly enlarged and centrally formed with a longitudinal tongue 2. Each tongue is round in cross section for reception in a complemental groove 3 in the blocks that provide the foot members 4. Each foot 4, adjacent one of its ends has a bolt opening 5 and another inner bolt opening 6. The foot 4 provides for the adjustment of the cross bars 1 on different widths of automobiles. When the foot is to be extended only a slight distance beyond the ends of the cross bar a bolt 7 is passed through the opening 6 in the foot and through an aligning opening in the ends of the cross bar. When the foot is to be projected a greater distance, the nut 11 which is screwed on the bolt 7 is released therefrom, or unscrewed a sufficient distance to permit of the groove 3 being brought out of engagement with the tongue 2 so that the foot 4 has its ends reversed. When the foot is to be projected a less distance beyond the end of the cross bar the bolt 7 is passed through the opening 6 and through the opening in the ends of the cross bar. The opening 6 is arranged to one side of the center of the foot so, in accordance with the end of the foot that is extended from the end of the cross bar various and nice adjustments may be obtained. The nut 11 when screwed home on the bolt 7 locks the foot on the bar.

The bolt 7 passes through the straight end 8 of an angle bracket 9. The outer end 10 of the bracket is also straight, and receives therethrough a cross sectionally round rod 12 that is driven into the ends of the cross bars. The rods 12 pass through one of a series of openings 15 in wear plates 13 secured on the under face of the hingedly secured sections constituting the side rails 14 of the improvement.

The fabric facing 16 of the bed is tacked or otherwise secured to the rails 14 and is designed to be folded with the rails into a small package when the bed is not in use.

The cross bars 1 are each constructed of two similar sections, one of which being provided adjacent to its inner end with the inverted U-shaped bar or stirrup on which the central rails 14 rest. Both arms of the inverted U-shaped stirrup are inserted in the cross bars. Slidable and revoluble on one of the arms of the stirrup 17 there is a clamping plate. The clamping plate comprises a body 18 having an angle end or lip 20. Below and to the outer side of the stirrup there is secured on the under edge of the referred to cross bar section an outstanding plate 21, and this plate affords a rest for the second and slidable section of the cross bars.

The first mentioned cross bar section has pivoted, as at 22, to its inner end a substantially U-shaped hinge 23, and through this hinge the slidable cross bar section has its inner end passed. On its top the slidable cross bar section is provided with two spaced stops 24 and 25 respectively. These stops are preferably in the nature of headed screws. As disclosed by the drawings the hinge 23 is designed to be swung with the movable cross bar section so that the said sections may be arranged side by side when in folded position and likewise have their opposite sides in contacting engagement when in spread position. When in last mentioned position the slidable cross bar section may be moved longitudinally in either direction with respect to the fixed cross bar section, such movement being limited by the contacting engagement of the stop 24 when brought against the clamping plate 18 and by the contact of the stop 25 with the upper plate of the hinge 23. When in spread condition the slidable cross bar section is supported by the lower plate of the hinge 23 and by the ledge or supporting plate 21. The clamping plate is moved over both bars so that its lip will engage the outer side of the movable cross bar section. Thus the outward swinging of one bar section on the other will be prevented, and likewise sinking or sagging of the said sections will be effectively overcome by the hinge and ledge plate supports for the movable cross bar section. When the sections are swung to folded position the clamping plate 18 is reversely swung on the arm of the stirrup to bring its lip 20 into contacting engagement with the opposite face of the slidable cross bar section.

The invention is susceptible to various changes in its form, proportions and minor details of construction and therefore the improvement is to be restricted only to the scope of its claims.

Preferably the movable cross bar section is provided with a number of spaced openings for the stop 25 to facilitate the arrangement of the device in an automobile after the foot blocks 4 have been adjusted with respect to the car in which the bed is employed.

Having described the invention, I claim:—

1. A folding bed support comprising a frame made up of hingedly connected rails and sectional cross bars on which the rails are supported, hinges on the inner end of each cross bar section on which the other cross bar is both swingable and slidable, a plate on the under face of each of the first mentioned cross bar sections providing a rest for the swingable and slidable cross bar section, and clamping means for the sections.

2. A foldable bed support for automobiles comprising hingedly connected rails having a fabric facing attached thereto, and cross bars for supporting the rails, each of said cross bars including a fixed section and a movable section, a hinge element on the inner end of each fixed section through which the movable section is slidably supported, a plate on the fixed section providing an additional support for the movable section, clamping means for the sections, and means limiting the slidable arrangement of the movable on the fixed cross rail section.

3. A foldable bed support comprising a frame made up of rails, a fabric facing secured thereon, and cross bars for supporting the rails and body, each of said cross bars comprising two sections, a substantially U-shaped hinge pivoted at the end of one of the sections and through which the other section is slidably received, a plate on the first mentioned section providing a rest for the second mentioned section when the sections are extended and in longitudinal alignment, a swingable clamp on the first mentioned section to engage the second mentioned section when the sections are extended or when the sections are folded against each other, and means on the last mentioned section for contacting engagement with the clamp for limiting the slidable adjustment of the sections.

4. A cross bar for supporting a bed frame, comprising two sections, a U-shaped element having its arms pivoted to the end of one section and slidably receiving the other section therethrough, latching means between the sections, and means for limiting the slidable movement of the last mentioned on the first mentioned section.

5. The combination with the cross bar and rail of a foldable automobile bed, of a swingable foot on the cross bar, interengaging means between the foot and cross bar, locking means between the foot and cross bar, a bracket on the upper edge of the cross bar secured by said means, said bracket having an upper angle end, a rod projecting therefrom, and said rail having spaced apertures to receive the rod therein.

6. The combination with a cross bar and a rail of a foldable automobile bed, of a bracket having angle ends secured to the cross bar, a rod passing through the upper end of the bracket and driven into the cross bar, the rail having an apertured metal plate secured on the under face thereof and having openings aligning with the apertures in the plate designed to receive therein the projecting end of the rod when the rail is supported on the bracket.

7. A foldable bed support comprising a frame made up of rails, a fabric facing secured thereon, and cross bars for supporting the rails and body, each of said cross bars comprising two sections, a substantially U-shaped hinge pivoted at the end of one of the sections and through which the other section is slidably received, a plate on the first mentioned section providing a rest for the second mentioned section when the sections are extended and in longitudinal alignment, a swingable clamp on the first mentioned section to engage the second mentioned section when the sections are extended or when the sections are folded against each other, means on the last mentioned section for contacting engagement with the clamp for limiting the sliding adjustment of the sections in one direction, and means also on the last mentioned section for contacting engagement with the hinge for limiting the swinging of the sashes in a second direction.

In testimony whereof I affix my signature.

BURTON E. CRAIN.